United States Patent [19]
Gillin

[11] 3,898,012
[45] Aug. 5, 1975

[54] SEPARABLE FASTENER FOR PARTS OF FURNITURE

[76] Inventor: William Joseph Gillin, 666 Kelton Ave., Westwood, Calif. 90024

[22] Filed: June 29, 1973

[21] Appl. No.: 375,162

[52] U.S. Cl. .............. 403/287; 403/292; 403/328
[51] Int. Cl. ............................................ F16b 12/10
[58] Field of Search ........... 403/296, 287, 292, 328, 403/231, 230, 187, 200, 201, 406, 408, 407, 7; 52/753 E, 756, 757, 753 F, 755

[56] References Cited
UNITED STATES PATENTS
3,129,472  4/1964  Hensel ................................. 403/7

FOREIGN PATENTS OR APPLICATIONS
1,947,456  9/1970  Germany ........................... 403/292

Primary Examiner—Andrew V. Kundrat
Attorney, Agent, or Firm—Synnestvedt & Lechner

[57] ABSTRACT

A separable fastener is disclosed especially for use with pieces of furniture adapted to be separated and reassembled in one or more relationships. The device includes sockets provided in 2 parts to be joined, one socket having a helical thread and the other socket having a recess adapted respectively to cooperate with the helical thread and a spring pressed detent carried by a pin adapted to be inserted into and withdrawn from the sockets.

5 Claims, 18 Drawing Figures

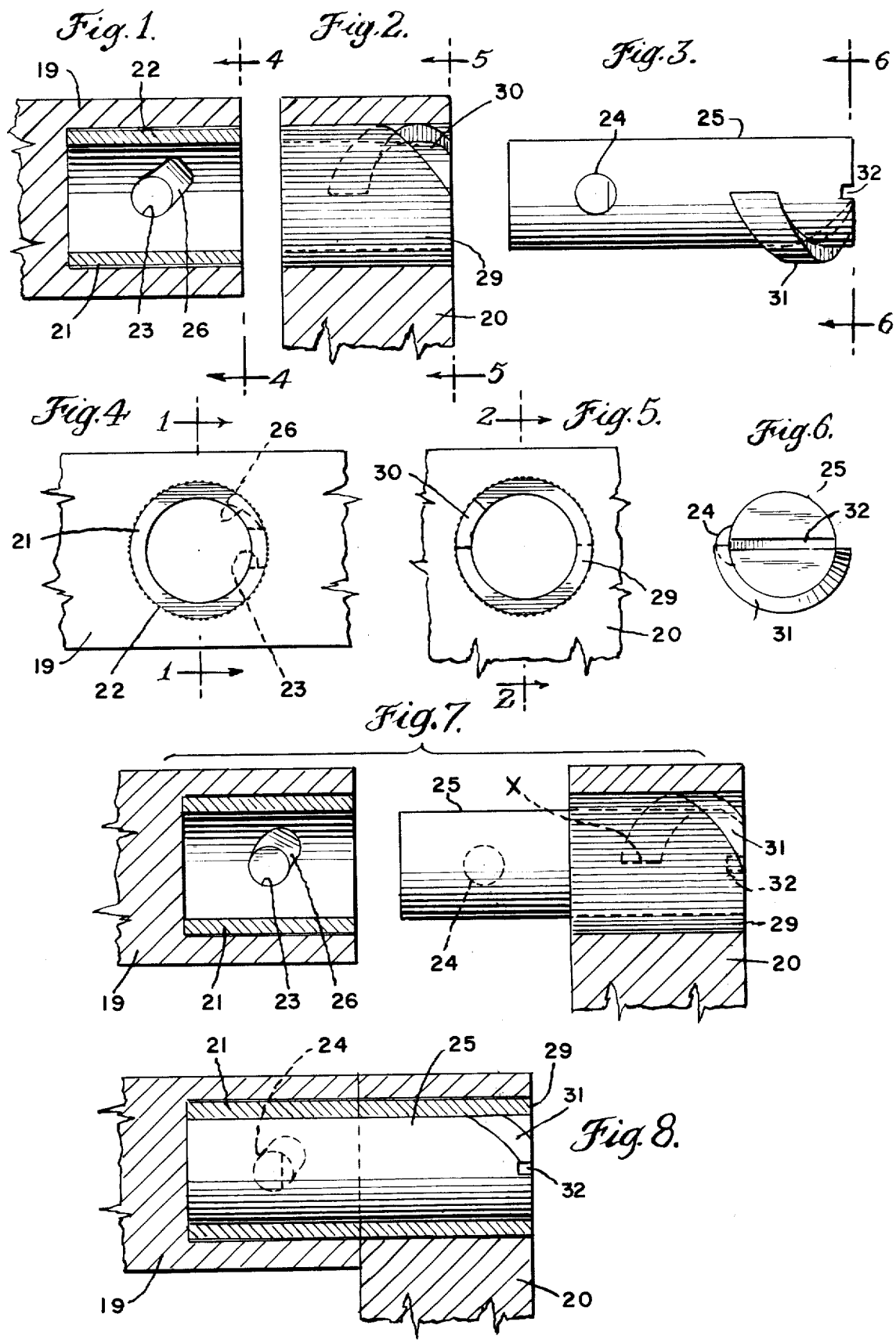

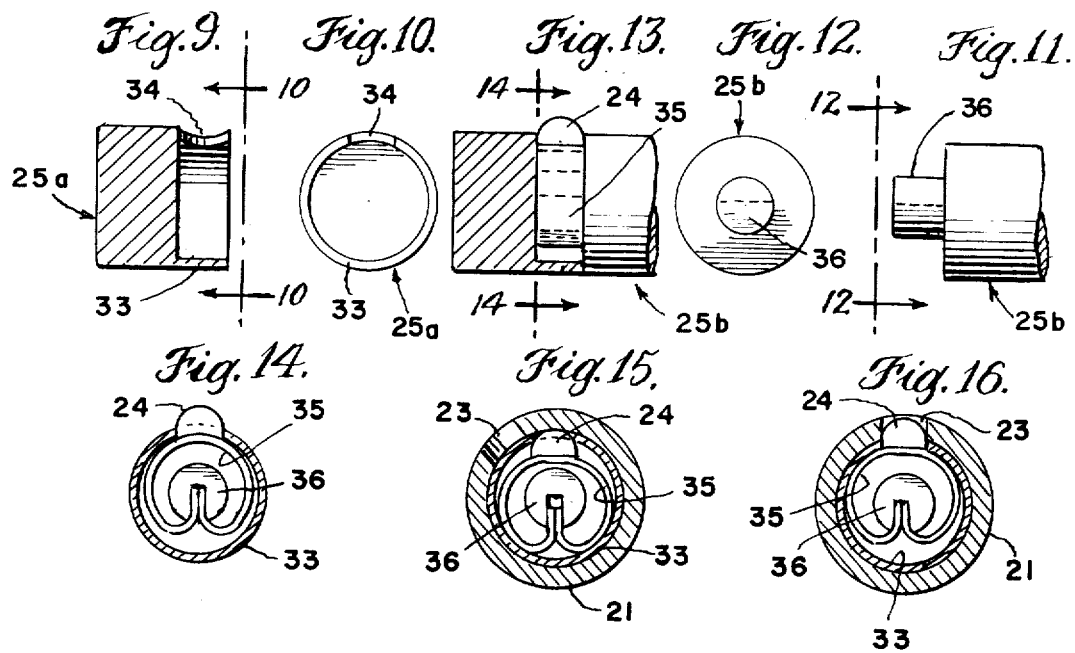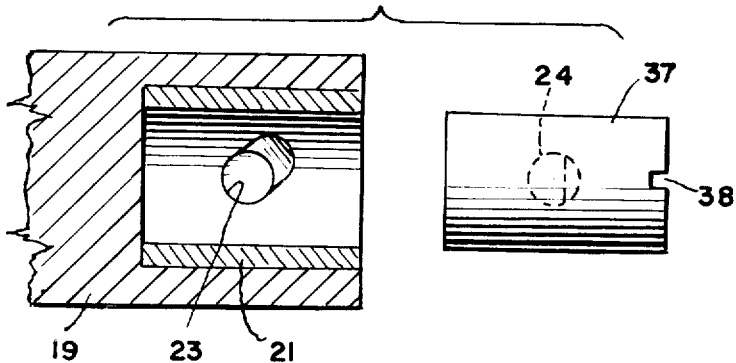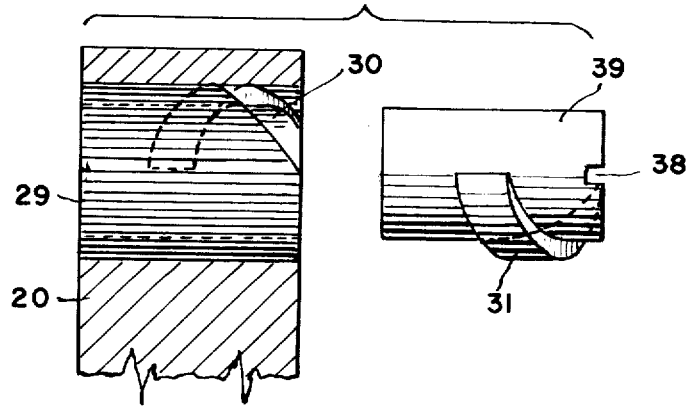

3,898,012

1

SEPARABLE FASTENER FOR PARTS OF FURNITURE

This invention relates to separable fasteners and while the device of the invention is adaptable to a wide variety of specific purposes, it is particularly well suited for use with parts or elements of furniture which are adapted to be assembled and disassembled.

In some cases parts or elements of furniture are of modular design so that they may be assembled in various different relationships, and the separable fastener of the present invention is well adapted to use in connection with such modular furniture.

It is also noted that the device of the invention, although particularly adapted for use with wooden furniture, is also adapted for use with various metal structures.

Since the invention is especially adapted to use with wooden furniture, it will be hereinafter specifically described in that connection.

One of the principal general objectives of the invention is the provision of a separable fastener providing a sturdy and secure joint, while at the same time making possible quick and easy separation of the joint parts and thus of the connected furniture elements.

A further object of the invention is to provide a separable fastener which is completely recessed within the external confines or surfaces of the parts to be joined.

It is a further object of the invention to provide a separable joint device embodying a joining pin which is received in sockets in the elements being connected, which pin has an end provided with a slot or the like for cooperation with a tool preferably a screw driver, by means of which the pin may be turned and thereby readily separated from the sockets provided in the joined parts.

Still another object of the invention is the provision of a half-pin element proportioned to be received in individual sockets recessed within furniture parts to be connected, these alternative half-pins being employed to close the recesses when the furniture parts are not interconnected by means of those particular sockets.

How the foregoing and other objects and advantages are attained will be clear from the following description referring to the accompanying drawings, all of which are on an enlarged scale and in which FIG. 1 is an axial sectional view through a socketed furniture part in which the socket has a recess for receiving a detent, this view being taken as indicated by the section line 1—1 on FIG. 4;

FIG. 2 is a sectional view through another socketed furniture part in which the socket is provided with an internal thread, this view showing the socket in elevation, but being taken as indicated by the section line 2—2 on FIG. 5;

FIG. 3 is an elevational view of a joint pin having a spring pressed detent and thread adapted respectively to cooperate with the recess and thread of the sockets shown in FIGS. 1 and 2;

FIG. 4 is an end view of the parts shown in FIG. 1, taken as indicated by the line 4—4 on FIG. 1;

FIG. 5 is an end view of the parts shown in FIG. 2, taken as indicated by the line 5—5 on FIG. 2;

FIG. 6 is an end view of the pin shown in FIG. 3, taken as indicated by the line 6—6 on FIG. 3;

FIGS. 7 and 8 are views illustrating a sequence of operations followed when assembling the parts shown in FIGS. 1 to 6;

2

FIGS. 9 to 14 inclusive are views illustrating the construction of a fastening pin made according to the present invention, FIGS. 10, 12 and 14 being taken respectively as indicated by the lines 10—10 on FIG. 9, 12—12 on FIG. 11, and 14—14 on FIG. 13;

FIGS. 15 and 16 are transverse sectional views illustrating the action of the spring pressed detent of the fastening pin when being inserted into a recessed socket;

FIG. 17 illustrates an alternatively insertable half-pin element for use in closing a socket having a detent recess; and FIG. 18 illustrates alternatively insertable halfpin element for use in closing a socket having an internal thread.

For purposes of this description, it is assumed that a pair of parts to be joined comprise wood elements of furniture such as the structural element indicated at 19 and a board indicated at 20. These elements may be made of any material but most commonly of wood either in its natural state, or as plywood, or as veneered board, or as pressed board.

The element 19 is recessed or provided with a socket, the socket itself preferably being formed internally of a sleeve 21 proportioned to provide for snug or pressed fitting into a recess in the element 19. As best seen in FIG. 4 the sleeve is provided with a knurled or fluted external surface as indicated at 22 serving to prevent rotation of the sleeve in the recess. Advantageously the sleeve is bonded in the recess, for instance by adhesive. The sleeve may be composed of various materials including metal, but various of the resins such as nylon are preferred. This is also true of other sleeves and of the joint pins all of which parts are advantageously made of nylon. For this purpose the tougher nylons are desirable, such as polyhexamethylene adipamide.

The sleeve 21 is provided with a recess 23 in its inside surface adapted to receive a spring press detent indicated at 24, the detent being carried by the pin 25 as shown in FIG. 3. A tapered helical lead-in groove 26 (see FIGS. 1 and 4) is provided adjoining the recess 23 to facilitate withdrawal of the detent 24 from the recess when the pin is turned to separate the joint, as will be described hereinafter.

The board or other element indicated at 20 is also provided with a sleeve 29 received in a recess in the element 20 and provides a socket for receiving the joint pin 25. The wall of this sleeve is cut out to provide a helical groove or thread 50 adapted to cooperate with the helical thread 31 provided on the pin 25. The sleeve 29 is desirably knurled or fluted as in the case of the sleeve 21 and the sleeve 29 is also preferably adhesively secured in position. It will be noted further that the sleeve 29 has both of its ends open at opposite side faces of the element 20, so that when the two elements 19 and 20 are brought together with the sleeves in alignment with each other the pin 25 may be inserted through the sleeve 29 and into the sleeve 21.

A typical insertion operation is illustrated in FIGS. 7 and 8. Here it will be seen that with the elements 19 and 20 separated, the pin is first inserted into the sleeve 29 of the element 20, by turning the pin with relation to the element in order to cause the thread 31 to enter the thread groove 30. By terminating the end of the thread 31 and the end of the thread slot 30 at the line indicated at x, the inter-engagement of the end of the thread groove with the end of the slot may be used as a limiting stop providing for proper inter-positioning of the pin 25 and the sleeve 29 (and thus of the furniture part 20) about the axis at the pin and socket. In this way proper positioning of the detent 24 so as to enter the recess 23 in the sleeve 21 may be assured.

After assembly of the pin 25 with the sleeve 29, this assembly may then be brought together with the part 19 by relative motion of the furniture parts in direction axially of the pin, during which motion the spring pressed detent 24 engages in the recess provided in the sleeve 21 and the connection or joining of the parts is thereby completed.

When it is desired to separate the joint parts and disconnect the furniture or other components connected by the joint, a tool such as a screw driver may be inserted in the slot 32 in the exposed end of the pin 25 (see FIGS. 3, 6 and 8) and the pin is turned in this manner, in consequence of which the thread 31 working in the slot 30 of the sleeve 29 causes the pin to retract, thereby disengaging the detent 24 from the recess 23 in the sleeve 21. The tapered helical groove 26 adjoining the recess 23 facilitates the disengagement of the detent from the recess 23. Continued turning of the pin 25 will bring about disengagement of the thread 31 from the groove 30, and the pin may then be completely withdrawn and the joint completely separated.

For the purpose of facilitating construction or fabrication of the pin, the pin may initially be formed of two parts 25a and 25b which are especially shaped in the manner described below and which are then brought together and then adhesively bonded to form a unitary pin. The pin part 25a is shown in both FIGS. 9 and 10 and the part 25b is shown in FIGS. 11 and 12. Part 25a is provided with a recess in one end surrounded by a cylindrical flange 33 having an aperture in one side as indicated at 34. This recess serves to accommodate the tempered steel spring band 35 on which the detent 24 is mounted.

The other pin part 25b is provided with a projecting boss 36 which is slotted at one side in order to receive the reversely bent end portions of the spring 35 (see FIGS. 14 to 16).

The spring 35 is so shaped as to urge the detent 24 outwardly to the position shown in FIG. 14. When the pin is inserted into a sleeve such as indicated at 21 having a recess for receiving the detent, the detent is depressed and the spring 35 deflected so that the pin be inserted into the sleeve (see FIG. 15). Upon reaching the position where the detent 24 may engage in the recess 23 (see FIG. 16) the spring action will again return the detent outwardly for engagement with the recess.

The two parts 25a and 25b are advantageously bonded to each other at the edge of the flange or lip 33 and finished to provide a smooth exterior surface. In order to add to the strength of the joint between the two pin parts, the boss 36 is made of sufficient height so that it also may be bonded to the central portion of the part 25a of the pin.

It will be understood that in the illustration of FIGS. 9 to 14 and in the above description of those Figures, the pin part 25b is intended to be extended for a length as shown in FIG. 3 and is intended to be supplied with a thread such as the thread 31 shown in FIG. 3. As above pointed out, the pin may be made of various materials, although a tough nylon is a particularly effective material. The pin parts may also be made of hard wood and regardless of the material employed, the end of the pin which is esposed, i.e., the slotted end described above with reference to FIGS. 3, 6 and 8, may be finished in a manner harmonizing with the adjacent surface of the furniture part with which the pin is used.

In FIG. 17 there is illustrated the same furniture part 19 as is shown in FIG. 1, this part having the sleeve 21 provided with a recess 23 for receiving a detent. FIG. 17 also shows a half-pin element 37 having screw driver slot 38 and constructed with a spring pressed detent 24. The half-pin 37 is insertable into the socket in the sleeve 21 of part 19, in order to close or plug the socket at times when that socket is not used or needed for purposes of making a joint. The half-pin 37 is preferably of length just sufficient to fill the socket and leave the outer end of the pin flush with the adjoining parts of the sleeve 21 and of the furniture part 19.

Similarly, in FIG. 18 there is illustrated the furniture part 20 shown in FIG. 2 having sleeve 29 therein provided with the helical thread or groove 30. Here a half-pin element 39 is shown, having a screw driver slot 38 and having also a thread 31 proportioned and arranged to enter and complimentarily cooperate with the helical groove 30. Half-pin 39 may be used alternatively to the full size pin when the socket in sleeve 29 of part 20 is not needed for the purpose of forming a joint. The pin 39 is proportioned so that the two ends thereof will lie flush with the adjoining surfaces of the sleeve 29 and the part 20 and will thus fill up and conceal the unused socket. Here also it is contemplated that the exposed end surfaces of the half-pins 37 and 39 may be decorated, colored or finished in a manner to harmonize with the adjoining surfaces of the furniture part.

By means of the separable joint or fastener herein illustrated and described, various parts may be separably fastened together, and in the case of modular furniture the separable fastener may readily be employed to permit changing the relative orientation of various parts of the furniture.

I claim:

1. A separable fastener adapted to separably interconnect a pair of elements, comprising a pair of cylindrical sockets, secured in bores in said elements, at least one of said sockets being extended through the element in which it is secured and having a helical thread in its inside surface, the other socket having a recess in its inside surface, and a pin insertable into and removable from said sockets when the sockets are aligned, one end of the pin having a helical thread adapted to mate with the helical thread in said one socket, and the other end of the pin having a yielding detent engageable and disengageable with the recess in said other socket.

2. A fastener as defined in claim 1 in which the pin is proportioned so that an end thereof is substantially flush with the external surface of one of the elements when the pin is inserted in the sockets, and the pin further having a slotted end adapted to cooperate with a tool for turning the pin and thereby removing the pin.

3. A fastener as defined in claim 1 in which the recessed socket further has a tapered helical groove extended from the recess therein to facilitate separation of the detent when the threaded part of the pin is turned and withdrawn from the threaded socket.

4. A fastener as defined in claim 1 which the pin has an internal cavity in which the detent is mounted, and a spring accomodated in said cavity and acting on the detent to yieldingly urge the detent outwardly.

5. A separable fastener adapted to separably interconnect a pair of elements, comprising a pair of cylindrical sockets secured in bores in said elements, at least one of said sockets being extended through the element in which it is secured and having a helical thread in its inside surface, the other socket having a recess in its inside surface, a unitary pin having end portions one of which is threaded and the other of which carries a yielding detent, the thread of the pin and said detent being positioned to cooperate respectively with the threaded and recessed sockets, and half-pin elements one of which is threaded and the other of which is provided with a yielding detent, the half-pin elements being insertable in the sockets alternatively to said unitary pin.

* * * * *